(12) United States Patent
Kim et al.

(10) Patent No.: US 10,513,984 B2
(45) Date of Patent: Dec. 24, 2019

(54) SYSTEM FOR SUPPRESSING ACOUSTIC NOISE WITHIN A GAS TURBINE COMBUSTOR

(71) Applicant: General Electric Company, Schenectady, NY (US)

(72) Inventors: Kwanwoo Kim, Cincinnati, OH (US); Fei Han, Clifton Park, NY (US); Owen Graham, Saratoga Springs, NY (US)

(73) Assignee: General Electric Company, Schenectady, NY (US)

(*) Notice: Subject to any disclaimer, the term of this patent is extended or adjusted under 35 U.S.C. 154(b) by 713 days.

(21) Appl. No.: 14/834,467

(22) Filed: Aug. 25, 2015

(65) Prior Publication Data

US 2017/0058780 A1 Mar. 2, 2017

(51) Int. Cl.
*F02C 7/045* (2006.01)
*F02C 7/24* (2006.01)
(Continued)

(52) U.S. Cl.
CPC .................. *F02C 7/24* (2013.01); *F01D 9/02* (2013.01); *F01D 25/04* (2013.01); *F02C 3/04* (2013.01);
(Continued)

(58) Field of Classification Search
CPC .... F23R 3/04; F23R 2900/00014; F02C 7/04; F02C 7/45; F02C 9/18; F05D 2260/96;
(Continued)

(56) References Cited

U.S. PATENT DOCUMENTS 3,777,489 A * 12/1973 Johnson .................. F01D 9/065
60/226.1
5,685,157 A 11/1997 Pandalai et al.
(Continued)

FOREIGN PATENT DOCUMENTS

CN 102933904 A 2/2013
DE 196 35 545 C1 2/1998
(Continued)

OTHER PUBLICATIONS

Extended European Search Report and Opinion issued in connection with corresponding EP Application No. 16184595.3 dated Jan. 20, 2017.
(Continued)

*Primary Examiner* — Arun Goyal
(74) *Attorney, Agent, or Firm* — Dority & Manning, P.A.

(57) ABSTRACT

In one aspect the present subject matter is directed to a system for suppressing acoustic noise within a combustion section of a gas turbine. The system includes at least one static structure disposed forward of a combustion chamber defined within the combustion section. The static structure at least partially defines a diffuser cavity upstream of the combustion chamber. A baffle plate is coupled to the static structure. The baffle plate and the static structure at least partially define an air plenum within the combustion section forward of the combustion chamber. The baffle plate includes an aperture that provides for fluid communication between the diffuser cavity and the air plenum. The at least one static structure and the baffle plate define a Helmholtz resonator within the combustion section.

18 Claims, 5 Drawing Sheets

(51) Int. Cl.
    *F01D 25/04*     (2006.01)
    *F02C 3/14*     (2006.01)
    *F23R 3/04*     (2006.01)
    *F01D 9/02*     (2006.01)
    *F02C 3/04*     (2006.01)
    *F02C 7/04*     (2006.01)
    *F02C 9/18*     (2006.01)
    *F23R 3/42*     (2006.01)

(52) U.S. Cl.
    CPC .................. *F02C 3/14* (2013.01); *F02C 7/04* (2013.01); *F02C 9/18* (2013.01); *F23R 3/04* (2013.01); *F23R 3/42* (2013.01); *F05D 2220/32* (2013.01); *F05D 2220/36* (2013.01); *F05D 2240/24* (2013.01); *F05D 2240/35* (2013.01); *F05D 2260/963* (2013.01); *F05D 2260/964* (2013.01); *F23R 2900/00014* (2013.01); *Y02T 50/672* (2013.01); *Y02T 50/675* (2013.01)

(58) Field of Classification Search
    CPC ......... F05D 2260/963; F05D 2260/964; F01D 25/04
    See application file for complete search history.

(56) References Cited

U.S. PATENT DOCUMENTS

| | | | |
|---|---|---|---|
| 6,164,058 | A | 12/2000 | Dobbeling et al. |
| 7,607,308 | B2 | 10/2009 | Kraft et al. |
| 7,788,926 | B2 | 9/2010 | Johnson et al. |
| 8,511,096 | B1 | 8/2013 | Haugen et al. |
| 8,839,624 | B2 | 9/2014 | Schnell et al. |
| 8,943,825 | B2 | 2/2015 | Magni et al. |
| 2004/0211185 | A1 | 10/2004 | Young et al. |
| 2005/0229581 | A1 | 10/2005 | Bellucci et al. |
| 2006/0059913 | A1 | 3/2006 | Bethke et al. |
| 2006/0207259 | A1 | 9/2006 | Holt et al. |
| 2007/0169992 | A1 | 7/2007 | Wasif et al. |
| 2007/0209366 | A1 | 9/2007 | Gerendas et al. |
| 2008/0041058 | A1 | 2/2008 | Johnson et al. |
| 2008/0087019 | A1 | 4/2008 | Macquisten et al. |
| 2008/0295519 | A1 | 12/2008 | Park |
| 2009/0282830 | A1 | 11/2009 | Eroglu et al. |
| 2009/0293481 | A1 | 12/2009 | Bethke |
| 2010/0058763 | A1 | 3/2010 | Rubio et al. |
| 2011/0005233 | A1 | 1/2011 | Sadig et al. |
| 2011/0138812 | A1 | 6/2011 | Johnson |
| 2011/0139541 | A1 | 6/2011 | Schuemians et al. |
| 2011/0179795 | A1 | 7/2011 | Johnson et al. |
| 2011/0179796 | A1 | 7/2011 | Magni et al. |
| 2011/0220433 | A1 | 9/2011 | Nakamura et al. |
| 2011/0232288 | A1 | 9/2011 | Bizouard et al. |
| 2011/0265484 | A1 | 11/2011 | Huber et al. |
| 2012/0006028 | A1 | 1/2012 | Lee et al. |
| 2012/0167574 | A1 | 7/2012 | Uskert |
| 2012/0260657 | A1 | 10/2012 | Eroglu et al. |
| 2013/0008167 | A1 | 1/2013 | Akamatsu et al. |
| 2013/0037345 | A1 | 2/2013 | Wang et al. |
| 2013/0042627 | A1 | 2/2013 | Gerendas et al. |
| 2013/0074471 | A1 | 3/2013 | Khan et al. |
| 2013/0160453 | A1 | 6/2013 | Kimura et al. |
| 2013/0213056 | A1 | 8/2013 | Bulat et al. |
| 2013/0283799 | A1* | 10/2013 | Carey ....................... F23R 3/60 60/725 |

FOREIGN PATENT DOCUMENTS

| | | |
|---|---|---|
| DE | 102005062284 A1 | 1/2008 |
| EP | 0576717 A1 | 1/1994 |
| EP | 1703207 A1 | 9/2006 |
| EP | 1703207 B1 | 5/2012 |
| EP | 2446194 A1 | 5/2012 |
| EP | 2417394 A2 | 2/2015 |
| WO | WO 99/56059 | 11/1999 |
| WO | WO 2011/117533 A2 | 9/2011 |
| WO | WO 2012/093011 A1 | 7/2012 |
| WO | WO 2013/029981 A1 | 3/2013 |
| WO | WO 2013/083348 A2 | 6/2013 |
| WO | WO 2015/016995 A2 | 2/2015 |

OTHER PUBLICATIONS

Chinese Office Action Corresponding to Application No. 201610720278.5 dated Aug. 19, 2019.

\* cited by examiner

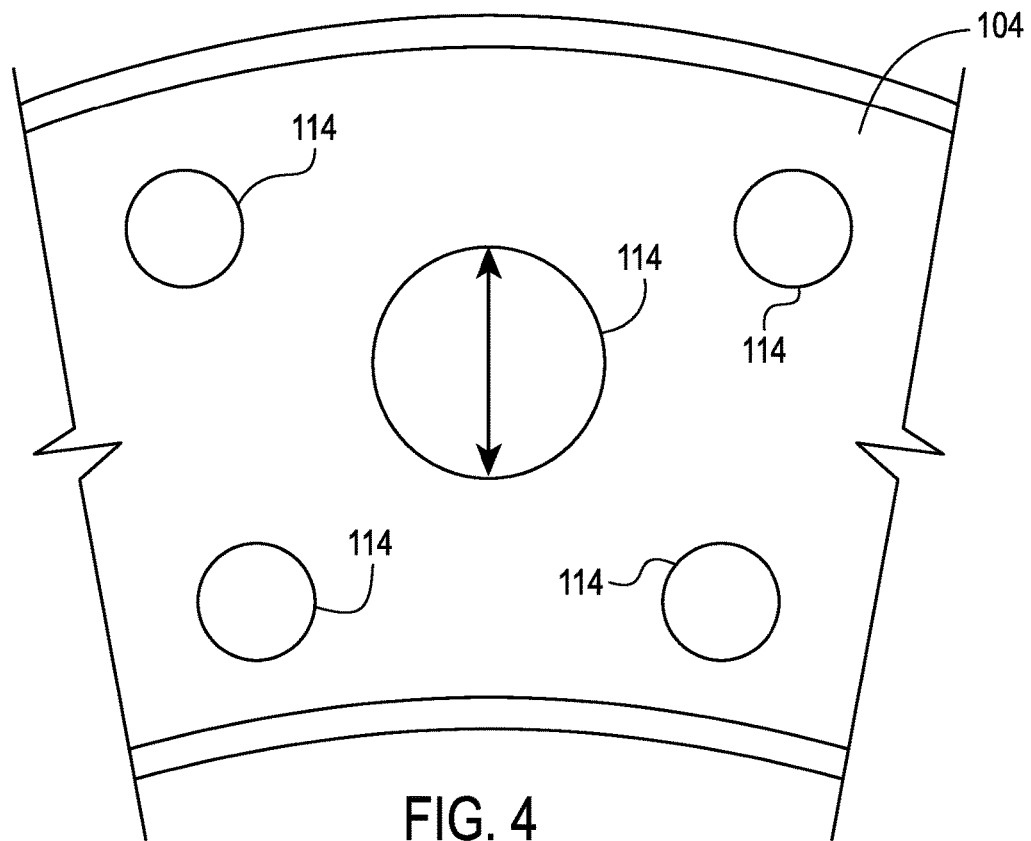
FIG. 4
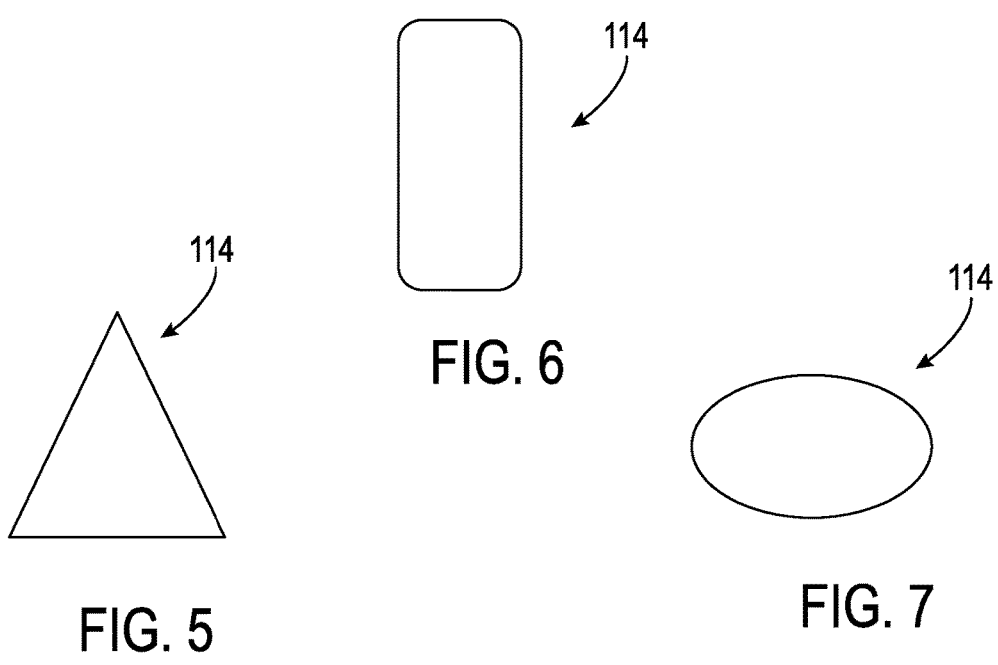
FIG. 5
FIG. 6
FIG. 7

SYSTEM FOR SUPPRESSING ACOUSTIC NOISE WITHIN A GAS TURBINE COMBUSTOR

FIELD OF THE INVENTION

The present subject matter relates generally to a gas turbine engine. More particularly, the present subject matter relates to a system for suppressing acoustic noise within a combustor of the gas turbine engine.

BACKGROUND OF THE INVENTION

A high-bypass type turbofan engine generally includes a fan section and a core gas turbine engine. The gas turbine engine includes, in serial flow order, a low pressure compressor, a high pressure compressor, a combustion section, a high pressure turbine and a low pressure turbine. A high pressure shaft couples the high pressure compressor to the high pressure turbine. A low pressure shaft extends coaxially within the high pressure shaft and couples the low pressure compressor to the low pressure turbine.

The fan section includes a plurality of fan blades coupled to a fan shaft and disposed upstream from an inlet of the low pressure compressor. The fan shaft may be coupled to the low pressure shaft either directly or indirectly, for example, via a gearbox. In particular configurations, an outer casing or nacelle circumscribes the fan blades and at least a portion of the gas turbine engine. A bypass air passage is defined between an outer casing of the gas turbine engine and the nacelle.

In operation, air flows across the fan blades and towards the bypass air passage. A portion of the air flows into the inlet of the low pressure compressor while the remainder of the air is routed through the bypass passage. The air flowing though the inlet is progressively compressed as it flows through the low pressure compressor and the high pressure compressor, thus providing a highly compressed air to a diffuser cavity or head end portion of the combustion section. A portion of the compressed air flows into a combustion chamber of the combustion section. Fuel is injected into the combustion chamber via one or more fuel injectors. The fuel and air mixture is burned to provide combustion gases. The combustion gases are routed from the combustion chamber through the high pressure turbine, thus rotatably driving the high pressure compressor via the high pressure shaft. The combustion gases then flow aft through the low pressure turbine, thereby rotatably driving the low pressure compressor and the fan blades via the low pressure shaft and the fan shaft. The combustion gases are exhausted from the gas turbine via an exhaust nozzle, thus providing a portion of total thrust of the turbofan engine.

As the fuel-air mixture burns, pressure oscillations or "combustion dynamics", driven at least in part by heat release during the combustion process, occur within the combustion chamber. These pressure oscillations generate acoustic waves that may propagate downstream from the combustion chamber towards the high pressure turbine and/or upstream from the combustion chamber back towards the diffuser cavity and/or the compressor outlet.

Low frequency to intermediate frequency combustion dynamics (50-250 Hz) such as those that occur during engine startup and/or during a low power to idle operating condition may negatively impact compressor stall margin, reduce operability margin of the turbofan engine and/or may increase external combustion noise or growl. In addition or in the alternative higher frequency combustion dynamics (250-1000 Hz) such as those that may occur during operation of the combustor may result in excitation of turbine blades or cause other vibration related issues. Consequently, a system for suppressing combustion dynamics within a combustion section of a gas turbine engine would be useful.

BRIEF DESCRIPTION OF THE INVENTION

Aspects and advantages of the invention will be set forth in part in the following description, or may be obvious from the description, or may be learned through practice of the invention.

In one aspect the present subject matter is directed to a system for suppressing acoustic noise within a combustion section of a gas turbine. The system includes at least one static structure disposed forward of a combustion chamber defined within the combustion section. The static structure at least partially defines a diffuser cavity upstream of the combustion chamber. A baffle plate is coupled to the static structure. The baffle plate and the static structure at least partially define an air plenum within the combustion section forward of the combustion chamber. The baffle plate includes an aperture that provides for fluid communication between the diffuser cavity and the air plenum. The at least one static structure and the baffle plate define a Helmholtz resonator within the combustion section.

Another aspect of the present subject matter is directed to a gas turbine engine. The gas turbine includes an outer casing that at least partially encases an annular combustor. The outer casing at least partially defines a diffuser cavity that is upstream from a combustion chamber of the annular combustor. A compressor diffuser body extends at least partially into the diffuser cavity. A baffle plate extends radially between the compressor diffuser body and the outer casing and circumferentially within the outer casing. The baffle plate, the compressor diffuser body and the outer casing at least partially define an air plenum within the outer casing forward of the combustion chamber. The baffle plate includes and/or defines an aperture that provides for fluid communication between the diffuser cavity and the air plenum. The air plenum at least partially defines a Helmholtz resonator within the outer casing.

Another embodiment of the present disclosure is directed to a high by-pass turbofan engine. The Turbofan engine includes a gas turbine engine having, in serial flow order, a low pressure compressor, a high pressure compressor, a combustion section including an annular combustor encased within an outer casing, a high pressure turbine and a low pressure turbine. The combustion section further comprises a diffuser cavity that is upstream from a combustion chamber of the annular combustor, at least a portion of a compressor diffuser body that extends into the diffuser cavity and a baffle plate that extends radially between the compressor diffuser body and the outer casing and circumferentially within the outer casing. The baffle plate, the compressor diffuser body and the outer casing at least partially define an air plenum within the outer casing forward of the combustion chamber. The baffle plate includes a plurality of apertures that provide for fluid communication between the diffuser cavity and the air plenum. The air plenum at least partially defines a Helmholtz resonator within the combustion section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 is an enlarged view of an exemplary baffle plate according to at least one embodiment of the present invention;

FIG. 5 provides an exemplary cross sectional shape of an aperture of the baffle plate as shown in FIG. 4, according to an exemplary embodiment of the present invention;

FIG. 6 provides an exemplary cross sectional shape of an aperture of the baffle plate as shown in FIG. 4, according to an exemplary embodiment of the present invention;

FIG. 7 provides an exemplary cross sectional shape of an aperture of the baffle plate as shown in FIG. 4, according to an exemplary embodiment of the present invention;

DETAILED DESCRIPTION OF THE INVENTION

Figure 1:
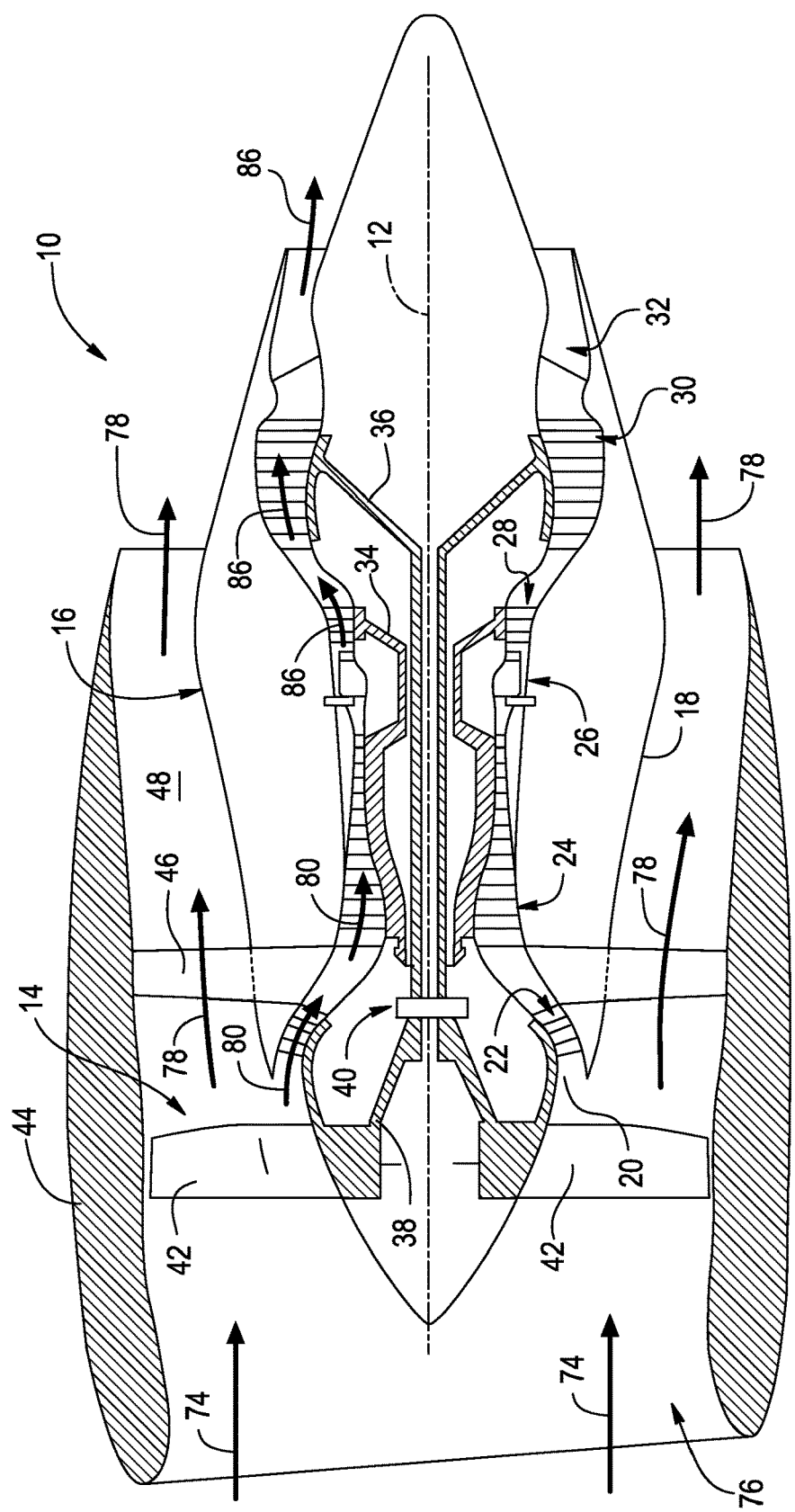
FIG. 1 is a schematic cross-sectional view of an exemplary high-bypass turbofan jet engine as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, wherein identical numerals indicate the same elements throughout the figures, FIG. 1 is a schematic partially cross-sectioned side view of an exemplary high by-pass turbofan jet engine 10 herein referred to as "turbofan 10" as may incorporate various embodiments of the present invention. As shown in FIG. 1, the turbofan 10 has a longitudinal or axial centerline axis 12 that extends therethrough for reference purposes. In general, the turbofan 10 may include a fan assembly 14 and a core turbine engine or gas turbine engine 16 disposed downstream from the fan assembly 14.

The gas turbine engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the gas turbine engine 16. It should be appreciated by those of ordinary skill in the art that the nacelle 44 may be configured to be supported relative to the gas turbine engine 16 by a plurality of circumferentially-spaced outlet guide vanes or struts 46. Moreover, at least a portion of the nacelle 44 may extend over an outer portion of the gas turbine engine 16 so as to define a bypass airflow passage 48 therebetween.

Figure 2:
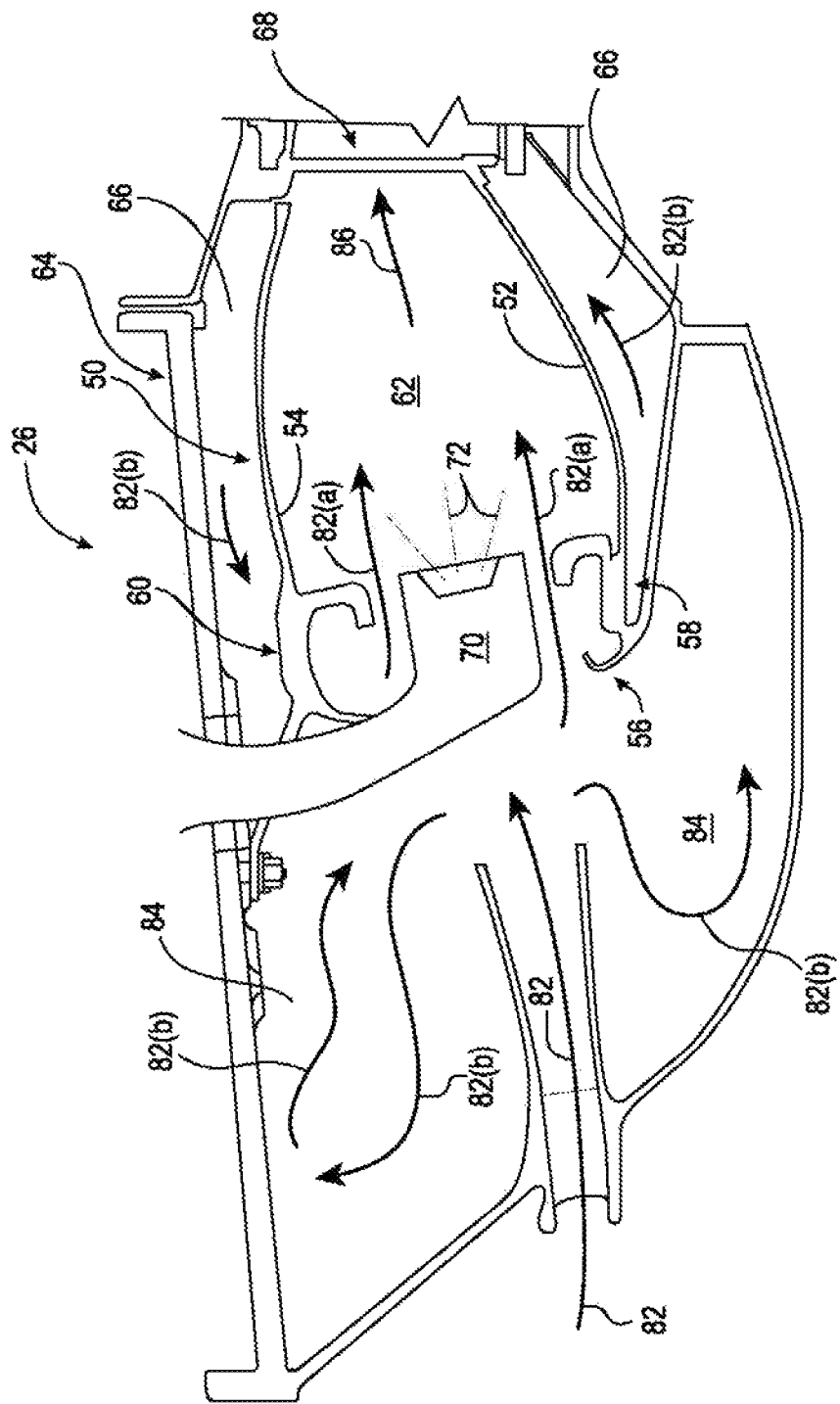
FIG. 2 is a cross sectional side view of a combustion section of the high by-pass turbofan jet engine as shown in FIG. 1, as may incorporate various embodiments of the present invention.

FIG. 2 is a cross sectional side view of an exemplary combustion section 26 of the gas turbine engine 16 as shown in FIG. 1, as may incorporate various embodiments of the present invention. As shown in FIG. 2, the combustion section 26 may generally include an annular type combustor 50 having an annular inner liner 52, an annular outer liner 54 and a generally domed end 56 that extends radially between upstream ends 58, 60 of the inner liner 52 and the outer liner 54 respectfully. As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within a combustor or outer casing 64. An outer flow passage 66 may be defined around the inner liner 52 and/or the outer liner 54. The inner liner 52 and the outer liner 54 may extend from the domed end 56 towards a turbine nozzle or inlet 68 to the HP turbine 28 (FIG. 1), thus at least partially defining a hot gas path between the combustor 50 and the HP turbine 28. A fuel injector or nozzle 70 may extend at least partially through the domed end 56 and provides a fuel 72 to the combustion chamber 62.

During operation of the turbofan 10, as shown in FIGS. 1 and 2 collectively, a volume of air as indicated schematically by arrows 74 enters the turbofan 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows into a diffuser cavity or head end portion 84 of the combustion section 26.

The compressed air 82 pressurizes the diffuser cavity 84. A first portion of the of the compressed air 82, as indicated schematically by arrows 82(a) flows from the diffuser cavity 84 into the combustion chamber 62 where it is mixed with the fuel 72 and burned, thus generating combustion gases, as indicated schematically by arrows 86, within the combustor 50. Typically, the LP and HP compressors 22, 24 provide more compressed air to the diffuser cavity 84 than is needed for combustion. Therefore, a second portion of the compressed air 82 as indicated schematically by arrows 82(b) may be used for various purposes other than combustion. For example, as shown in FIG. 2, compressed air 82(b) may be routed into the outer flow passage 66 to provide cooling to the inner and outer liners 52, 54. In addition or in the alternative, at least a portion of compressed air 82(b) may be routed out of the diffuser cavity 84. For example, a portion of compressed air 82(b) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the gas turbine engine 16 to provide propulsive thrust.

As the fuel-air mixture burns, pressure oscillations occur within the combustion chamber 62. These pressure oscillations may be driven, at least in part, by a coupling between the flame's unsteady heat release dynamics, the overall acoustics of the combustor and transient fluid dynamics within the combustor 50. The pressure oscillations generally result in undesirable high-amplitude, self-sustaining pressure oscillations within the combustor 50. These pressure oscillations may result in intense, frequently single-frequency acoustic waves that may propagate within the generally closed combustion section 26.

Depending, at least in part, on the operating mode of the combustor 50, these pressure oscillations may generate acoustic waves at frequencies ranging from about 50 Hz to about 1000 Hz or even higher. These acoustic waves may propagate downstream from the combustion chamber 62 towards the high pressure turbine 28 and/or upstream from the combustion chamber 62 back towards the diffuser cavity 84 and/or the outlet of the HP compressor 24. In particular, as previously provided, low frequency acoustic waves (50-250 Hz) such as those that occur during engine startup and/or during a low power to idle operating condition and/or higher frequency waves (250-100 Hz) which may occur during takeoff and other operating conditions may reduce operability margin of the turbofan engine and/or may increase external combustion noise or growl.

Figure 3:
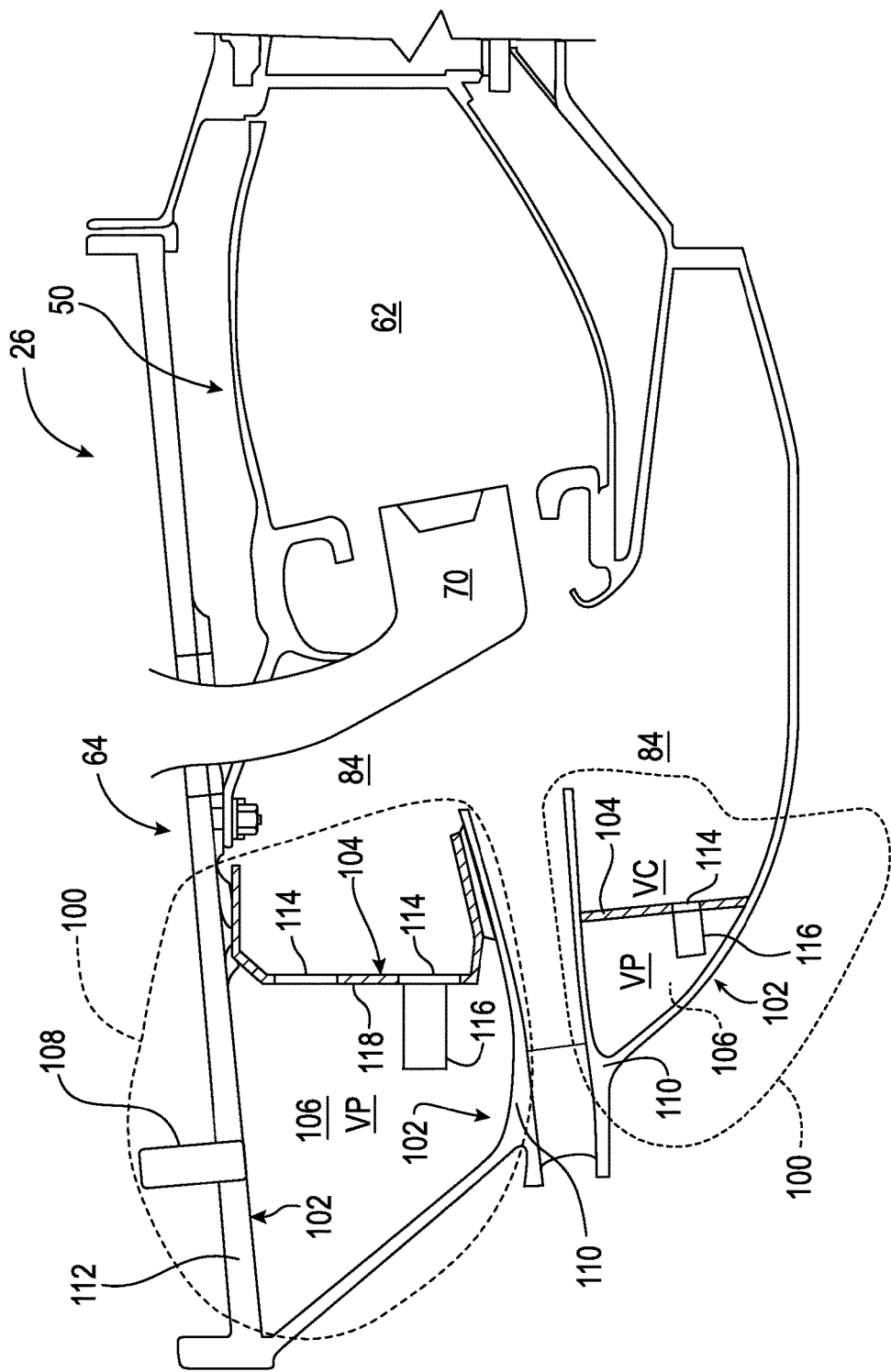
FIG. 3 is a cross sectional side view of a combustion section of the high by-pass turbofan jet engine as shown in FIG. 2, according to at least one embodiment of the present invention.

FIG. 3 is a cross sectional side view of the exemplary combustion section 26 of the gas turbine engine 16 as shown in FIG. 2, according to at least one embodiment of the present invention. In at least one embodiment, as shown in FIG. 3, the combustion section 26 includes a system 100 for suppressing acoustic noise within the combustion section 26 of the gas turbine engine 16. The system 100 as provided herein defines a Helmholtz resonator within the combustion section 26 that is tuned to a target frequency.

In various embodiments, as shown in FIG. 3, the system 100 includes one or more static structures or walls 102 that at least partially define the diffuser cavity 84, a baffle plate 104 that extends radially between the one or more static structures 102 and circumferentially within the outer casing 64 of the combustion section 26, and a bleed air plenum 106 defined between the baffle plate 104 and the one or more static structures 102. In at least one embodiment, the system 100 further includes a bleed-air extraction port 108 that provides for fluid communication out of the air plenum 106. In various embodiments, the one or more static structures 102, the baffle plate 104 and the air plenum 106 are disposed and/or defined within the combustion section 26 downstream from the HP compressor 24 (FIG. 1) and forward of and/or upstream from the fuel injector 70 and the combustion chamber 62 (FIG. 2).

In at least one embodiment, as shown in FIG. 3, the one or more static structures 102 may comprise, at least in part, a portion of a compressor diffuser body 110 of the HP compressor 24 and a portion 112 of the outer casing 64 that surrounds the combustion section 26. The air plenum 106 has a volume "VP" that is distinct from a volume "VC" of the diffuser cavity 84. In at least one embodiment, the bleed-air extraction port 108 defines a flow passage that extends from the air plenum through the outer casing 64. The bleed-air extraction port 108 may be fluidly connected to various components of the turbofan 10 and/or to various components of an associated aircraft (not shown).

In various embodiments, as shown in FIG. 3, the baffle plate 104 includes and/or defines one or more apertures or openings 114 that provide for fluid communication between the diffuser cavity 84 and the air plenum 106. FIG. 4 provides a front view of the baffle plate 104 as shown in FIG. 3, according to at least one embodiment of the present disclosure. As shown in FIG. 4, the baffle plate may include a plurality of the apertures 114. The apertures 114 may be size similarly or may be sized differently. The apertures 114 may have any shape and are not limited to any particular shape unless otherwise specified in the claims. By way of example but not limitation, as shown in FIGS. 4, 5, 6 and 7 respectively, the apertures 114 may be generally circular, generally triangular, generally rectangular/square or generally oval.

Figure 8:
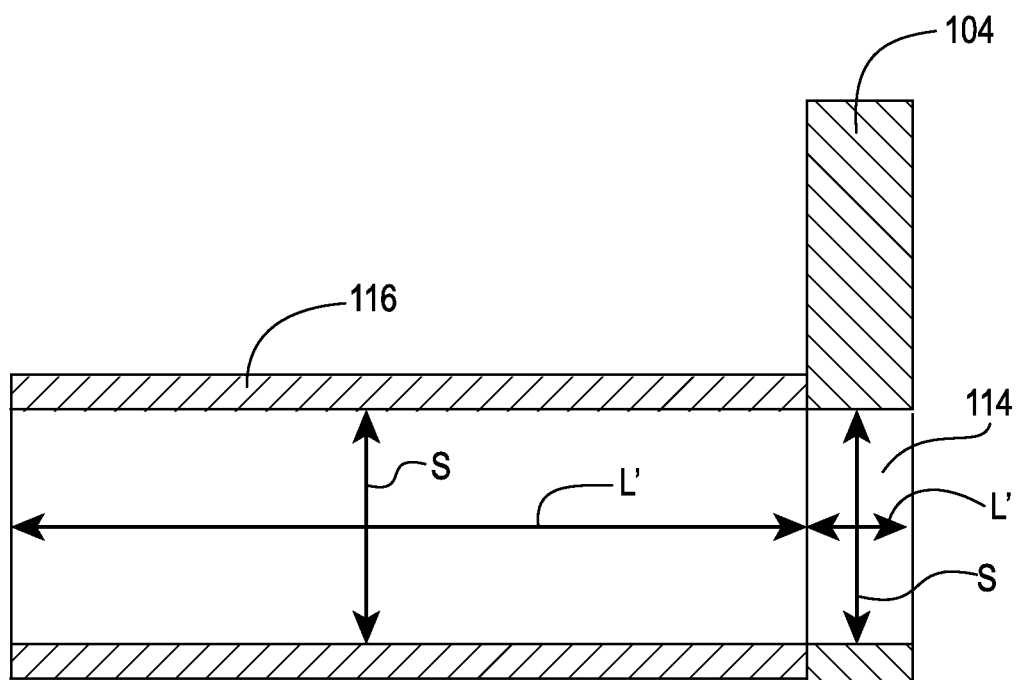
FIG. 8 is an enlarged cross sectional view of a portion of the baffle plate as shown in FIG. 4 including an exemplary resonator tube, according to at least one embodiment of the present invention.
Figure 9:
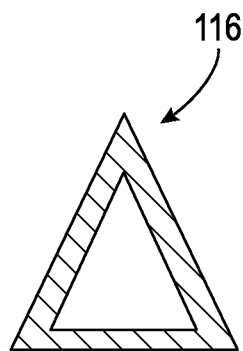
FIG. 9 provides an exemplary cross sectional shape of a resonator tube, according to an exemplary embodiment of the present invention.
Figure 10:
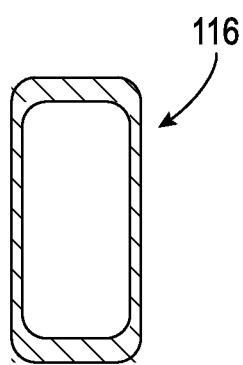
FIG. 10 provides an exemplary cross sectional shape of a resonator tube, according to an exemplary embodiment of the present invention.
Figure 11:
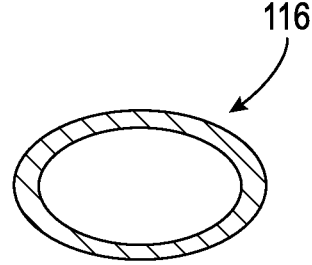
FIG. 11 provides an exemplary cross sectional shape of a resonator tube, according to an exemplary embodiment of the present invention.

In one or more embodiments, as shown in FIG. 3, the system 100 may include at least one resonator tube or resonator tube 116 that extends from an inner surface 118 of the baffle into the air plenum 106. In particular embodiments, the system 100 may include a plurality of resonator tubes 116 that extend from the inner surface 118 of the baffle into the air plenum 106. FIG. 8 provides a cross sectioned side view of a portion of the baffle plate 104 and an exemplary resonator tube 116 according to at least one embodiment of the present disclosure. As shown in FIG. 8, the resonator tubes 116 may be generally hollow or tubular and may be generally aligned with and in fluid communication with a corresponding aperture 114, thus providing for fluid communication through the resonator tube 116 between the diffuser cavity 84 (FIG. 3) and the air plenum 106 (FIG. 3). The resonator tubes 116 or the orifice 114 can have equal or non-equal size and may have unequal distribution circumferentially or radially.

The resonator tube(s) 116 may have any shape and are not limited to any particular shape unless otherwise specified in the claims. By way of example but not limitation, as shown in FIGS. 8, 9, 10 and 11 respectively, the resonator tube(s) 116 may be generally circular, generally triangular, generally rectangular/square or generally oval.

In order for the system 100 to target or suppress acoustic waves at specific frequencies within the combustion section 26, the air plenum 106 and the aperture(s) 114 the resonator tube(s) must be sized appropriately. In one embodiment, the air plenum 106, the aperture(s) 114 and the resonator tube(s) 116 may be sized using the following formula:

$$\text{target frequency} = \frac{c}{2\pi}\sqrt{\frac{A}{L'V}}$$

where, as shown in FIG. 8, c is the speed of sound, S is equal to an opening area of the resonator tube 116, V is equal to the volume of the air plenum and L' is the length of the resonator tube 116 with an end correction. In particular configurations, wherein the system 100 does not include a resonator tube, L' may be equal to the thickness of the baffle 104 at the aperture 114 location and S is equal to the opening area of the aperture 114.

As previously presented, the system 100 defines a Helmholtz resonator within the combustion section 26 that is tuned to a target frequency. The Helmholtz resonator is tuned by appropriately sizing the baffle plate 104, the aperture(s) 114 and the resonator tube(s) 116. During operation, a portion of compressed air 82(b) and the acoustic waves generated by the combustion process flow through the aperture(s) 114 in the baffle plate 104 and through the resonator tube(s) 116 into the air plenum 106. The bleed-air cavity 106 acts as a Helmholtz resonator within the combustion section 26 forward of and/or upstream from the fuel injector 70 and the combustion chamber 62. The aperture(s) 114 and/or the resonator tube(s) 116 allow for tuning of the Helmholtz resonator to suppress the target frequencies such as the low frequency acoustic waves (50-250 Hz) and/or the higher frequency waves (250-1000 Hz) generated within the combustion chamber 62 and propagating within the combustion section 26. Flow form the bleed-air extraction port 108 may be modulated to bias the flow out of bleed-air plenum, thus further enhancing the dampening effects of the system 100.

The system as illustrated in FIGS. 3-11 and described herein, may provide various technical advantages over existing combustor dampening systems. For example, system 100 is formed as an integral part of existing combustor architecture, therefore no additional space is required within the combustion section 26. The system 100 is relatively easily configurable to fit existing combustion systems and is uniquely tunable to target frequencies of a specific combustion system. The system 100 as provided herein is positioned upstream or forward of the combustion chamber 62, thereby reducing potential thermal issues associated with placing damping systems downstream from the combustion chamber 62. Other advantages of the system 100 may include reduction of compressor operability margins typically required for combustor noise or growl, mitigation of the need to use pilot/main split for combustor noise or growl control at sub-idle and idle conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for suppressing acoustic noise within a combustion section of a gas turbine, comprising;
at least one static structure disposed forward of a combustion chamber defined within the combustion section, the at least one static structure comprising at least a portion of a diffuser body and at least a portion of an outer casing surrounding the combustion section, wherein the at least one static structure at least partially defines a diffuser cavity upstream of the combustion chamber; and
a baffle plate coupled to the at least one static structure, wherein the baffle plate is extended radially between the outer casing and the diffuser body, and further wherein the baffle plate and the at least one static structure at least partially enclose an air plenum within the combustion section forward of the combustion chamber, wherein the air plenum is separated from a portion of the diffuser cavity via the baffle plate, the outer casing, and the diffuser body; the baffle plate including a plurality of apertures that provide for fluid communication between the portion of the diffuser cavity and the air plenum, wherein the air plenum defined by the static structure and the baffle plate, a length of the baffle plate at each of the plurality of apertures, and an opening area at each of the plurality of apertures of the baffle plate together comprise a Helmholtz resonator configured to a target frequency within the combustion section, wherein the plurality of apertures has an unequal circumferential distribution or unequal radial distribution through the baffle plate relative to one another.

2. The system as in claim 1, further comprising a resonator tube aligned and in fluid communication with at least one aperture of the plurality of apertures, the resonator tube extending away from an inner surface of the baffle plate into the air plenum, wherein a length of the resonator tube at least partially defines the Helmholtz resonator.

3. The system as in claim 2, wherein the resonator tube has a substantially circular cross sectional shape.

4. The system as in claim 2, wherein the resonator tube has a triangular, square or oval cross sectional shape.

5. The system as in claim 1, further comprising a bleed-air extraction port, wherein the bleed-air extraction port is in fluid communication with the air plenum.

6. The system as in claim 5, wherein the bleed-air extraction port defines a flow path from the air plenum through an outer casing that surrounds the combustor.

7. The system as in claim 1, wherein the baffle plate defines a plurality of resonator tubes, each resonator tube being aligned with a corresponding aperture of the plurality of apertures, each of the resonator tubes and the corresponding aperture providing for fluid communication between the portion of the diffuser cavity and the air plenum.

8. A gas turbine engine, comprising:
an outer casing that at least partially encases an annular combustor, the outer casing at least partially defining a diffuser cavity that is upstream from a combustion chamber of the annular combustor;
a compressor diffuser body that extends into the diffuser cavity;
a baffle plate that extends radially between the compressor diffuser body and the outer casing and circumferentially within the outer casing, wherein the baffle plate, the compressor diffuser body and the outer casing at least partially enclose an air plenum radially inward within the outer casing forward of the combustion chamber, wherein the air plenum defines a volume distinct from a volume of the diffuser cavity aft of the baffle plate, the baffle plate including a plurality of apertures that provide for fluid communication between the diffuser cavity aft of the baffle plate and the air plenum, wherein the air plenum, a length of the baffle plate at each of the plurality of apertures, and an opening area at each of the plurality of apertures of the baffle plate together at least partially define a Helmholtz resonator within the outer casing, wherein the plurality of apertures has an unequal size through the baffle plate relative to one another;
a plurality of resonator tubes, wherein at least two or more of the plurality of resonator tubes are aligned with at least two or more of the plurality of apertures of unequal sizes.

9. The gas turbine engine as in claim 8, wherein each of the plurality of resonator tubes extend away from an inner surface of the baffle plate into the air plenum, and wherein a length of each of the plurality of resonator tubes at least partially defines the Helmholtz resonator.

10. The gas turbine engine as in claim 9, wherein each of the plurality of resonator tubes has a substantially circular cross sectional shape.

11. The gas turbine engine as in claim 9, wherein each of the plurality of resonator tubes has a triangular, square or oval cross sectional shape.

12. The gas turbine engine as in claim 8, wherein at least one of the plurality of apertures at the baffle plate has a substantially circular cross sectional shape.

13. The gas turbine engine as in claim 8 wherein at least one of the plurality of apertures, at the baffle plate has a cross sectional shape that is triangular, rectangular or oval.

14. The gas turbine engine as in claim 8, further comprising a bleed-air-extraction port, wherein the bleed-air extraction port is in fluid communication with the air plenum.

15. The gas turbine engine as in claim 14, wherein the bleed-air extraction port defines a flow path from the air plenum through the outer casing that surrounds the combustor.

16. The gas turbine engine as in claim 8, wherein each of the plurality of resonator tubes being aligned with a corresponding aperture of the plurality of apertures, each of the resonator tubes and the corresponding aperture providing for fluid communication between the diffuser cavity and the air plenum.

17. A turbofan engine, comprising:
a gas turbine engine having, in serial flow order, a low pressure compressor, a high pressure compressor, a combustion section including an annular combustor encased within an outer casing, a high pressure turbine and a low pressure turbine, the combustion section further comprising:
a diffuser cavity that is upstream from a combustion chamber of the annular combustor;
a compressor diffuser body that extends into the diffuser cavity; and
a baffle plate that extends radially between the compressor diffuser body and the outer casing and circumferentially within the outer casing, wherein the baffle plate, the compressor diffuser body and the outer casing at least partially enclose an air plenum separated from the diffuser cavity by the baffle plate, wherein the air plenum is within the outer casing forward of the combustion chamber, the baffle plate including a plurality of apertures that provide for fluid communication between the diffuser cavity aft of the baffle plate and the air plenum, wherein a volume of the air plenum, a length of the baffle plate at the aperture, and an opening area at the plurality of apertures of the baffle plate together at least partially comprise a Helmholtz resonator within the combustion section, wherein the plurality of apertures has an unequal circumferential distribution or unequal radial distribution through the baffle plate, and wherein a plurality of resonator tubes is aligned to at least a portion of the plurality of apertures, and wherein a length of each of the plurality of resonator tubes at least partially defines the Helmholtz resonator to target acoustic waves at one or more frequencies.

18. The turbofan engine as in claim 17, further comprising a bleed-air extraction port, wherein the bleed-air extraction port is in fluid communication with the air plenum, wherein the bleed-air extraction port defines a flow path from the air plenum through the outer casing.

* * * * *